Sept. 15, 1959

B. COLE 2,904,003

POULTRY NEST BOTTOM

Filed Feb. 20, 1956

INVENTOR.
BERNARD COLE
BY
M. A. Hobbs
ATTORNEY

United States Patent Office 2,904,003
Patented Sept. 15, 1959

2,904,003
POULTRY NEST BOTTOM
Bernard Cole, Tipton, Ind.
Application February 20, 1956, Serial No. 566,555
5 Claims. (Cl. 119—45)

The present invention relates to poultry equipment and more particularly to poultry nesting equipment and materials.

Nesting materials now commonly used in the poultry industry consist principally of chopped straw and hay, shavings, sawdust, ground cobs, rice hulls and excelsior. All of these materials are loosely packed in the nest and can easily be scratched, scattered and thrown by the laying hen, often forming uneven and pocketed nests and, unless deep or thick beds of these materials are used, may be displaced sufficiently to expose the floor of the nest. These conditions increase the chances of cracking and breaking the eggs particularly by the hen when she is getting on and off the nest. While the use of long wisps of straw and hay minimizes the possibility of the hen parting the nest and exposing the floor, these long wisps often become entangled and catch on the hens' feet and sometimes lead to the destruction of the nest and the loss of the eggs. Further, proper cleaning of nests composed of these materials requires frequent use of new materials and preferably specially constructed nest equipment to facilitate removal and replacement of the nesting materials. It is therefore one of the principal objects of the present invention to provide a nesting material which will remain in place and not form pockets and which can be readily removed from the nest, cleaned and replaced without requiring the use of any special nest equipment.

Another object of the invention is to provide a nesting material for poultry which can be formed into a permanent pad-like nest and which is relatively soft and comfortable to the laying hen.

Still another object of the invention is to provide a unitary nesting pad or the like for poultry which is cut and shaped to the size of the nest and is adapted for use in either the individual or community type nests.

A further object of the invention is to provide a nesting pad or the like which remains in place in the nest and cannot be scratched apart by the hens and which can be removed from the nest as an integral unit, cleaned with water or other cleaning solution and replaced in the nest in the same shape and condition that it was before its original use.

Another object is to provide a self-cleaning nesting material which will function satisfactorily as a nest with a minimum amount of care and attention.

Another object of the invention is to provide a ventilated nest and nesting material for poultry which provides maximum cooling of the eggs promptly after being laid.

Another object of the invention is to provide a re-usable nesting pad or the like for poultry adapted to be easily fabricated, marketed and used with standard and conventional poultry nest equipment.

Another object of the invention is to provide a permanent nesting material which can be effectively treated with an insecticide.

Additional objects and advantages will become apparent from the following description and accompanying drawing, wherein.

Figure 1:
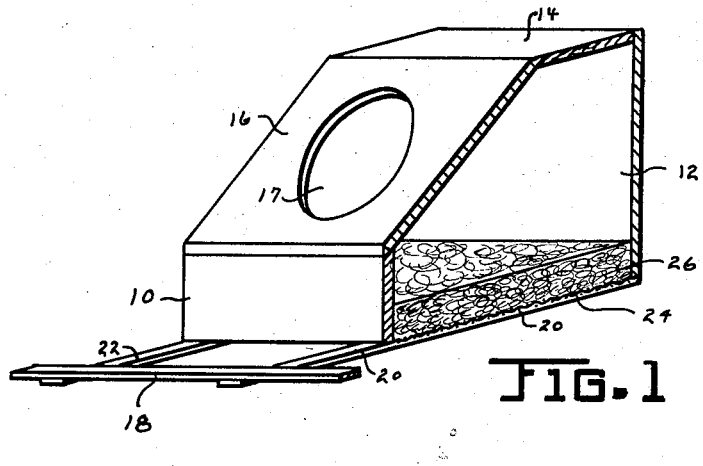
Figure 1 is an isometric view of an individual poultry nest from which one side has been removed to show the construction thereof, and the nesting material therein.

Referring more specifically to the drawing, the nest shown in Figure 1, from which one end has been removed to more clearly show the construction, consists of side walls 10 and 12, top 14 and a sloping front 16 having an oval opening 17 therein for the door. A run board or perch 18 supported by members 20 and 22 is normally provided for the hens in front of the nest. The nest bottom 24 on which the nesting material 26 is placed is preferably constructed of hardware cloth or the like; however a solid or closed bottom may be used if desired. The nest shown may be an individual unit having only one nest or it may be an individual nest of a multiple unit structure.

Figure 2:
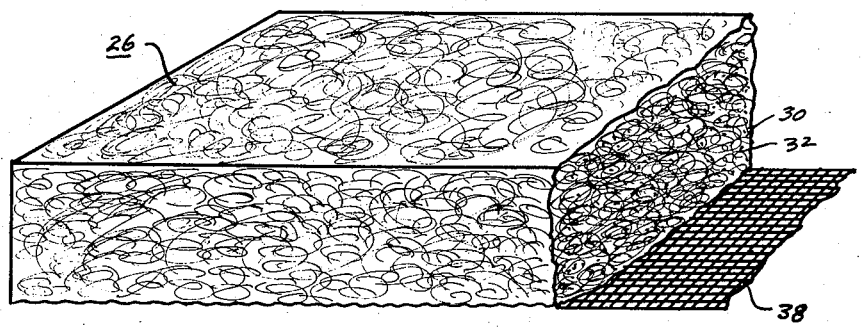
Figure 2 is an enlarged isometric view of my nesting material in the form of a pad, a portion of which is broken away to more clearly show the construction thereof.
Figure 4:
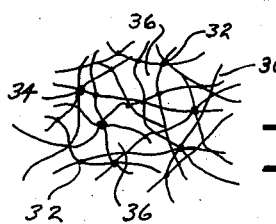
Figure 4 is an enlarged fragmentary view of my nesting material.

The nesting material 26 shown in Figures 1 and 2 is a flat pad-like member formed and shaped to fit the bottom portion of the nest and consists of loosely matted resilient fibrous material held in place by a rubber, rubber-like or plastic bonding material. The rubber may be either natural or synthetic material. Figure 4 shows the construction of the nesting material in greater detail. The strands of fiber 30 contact one another at a number of places along their length and the bonding material 32 joins or holds these strands together at those points of contact. At other points in the mass of fibrous material, a plurality of strands may pass through a globule 34 of bonding material and each strand may be held relatively rigid in the globule with respect to the other strands therein even though said strands are not in actual contact with one another. The relatively large amount of space between the strands of fibers and globules of bonding material is shown at numeral 36.

The bonding material is preferably applied to the fibrous material by spraying it as a fine mist into the formed mass of fibrous material. To give the entire pad more rigidity without diminishing the desired inherent internal resiliency, a layer of cheese or tobacco cloth 38 may be bonded to the bottom of the nesting pad. The strands of these two types of cloth are spaced sufficiently far apart that they do not seriously interfere with the passing of foreign matter through the nesting material. The cloth material may be joined to the mass of fibrous material by spraying the bonding material through the entire mass of fibrous material, preferably at the time when the bonding material is initially sprayed into the fibrous material.

An example of suitable material for the pad consists of numerous strands of animal hair, such as curled hog's hair, joined together at spaced points by either natural or synthetic rubber latex. The animal hair is resilient and, when joined by the latex material, forms a resilient pad which can easily be pressed out of its original shape but which will immediately return to its original shape when the pressure is released. The hair is preferably so thinly matted that air and light will readily pass through the material, and large particles of foreign matter carried into the nest by the hens will readily pass through the material and the supporting hardware cloth bottom 24 and drop from the nest. While this nesting material is resilient and soft to the touch, it is tough and difficult to pull apart; hence it forms a soft comfortable nest for the laying hen yet effectively withstands any attempts on her part to scratch or tear the material apart.

Examples of other material which may be used in the construction of my nesting pad consist of excelsior, plastic strands, and a number of vegetable fibers, such as mosses. The rubber latex or other bonding materials are sprayed into the formed mass of the material as explained hereinbefore with reference to the animal fiber material. While natural or synthetic rubber has been found particularly suitable for the bonding material in the formation of the nesting material, since it is in itself resilient and soft, other material may be used. For example phenolic resins and plastic material can be used satisfactorily.

The nesting pad is cut or otherwise formed into the desired size and shape and shipped and sold ready for use. The pad can be placed in the nest by, for example, distorting it from its flat shape and inserting through the door into the nest. As soon as the pad is released it flattens out and is easily moved to and arranged into its proper place in the nest. While the pad has self-cleaning characteristics, as will be more fully explained, it may become dirty and need to be cleaned. In this event the pad is merely lifted out of the nest and cleaned by dipping in water or other cleaning solution or spraying with a hose until clean. Animal hair and rubber latex are to a great extent water repellent, hence nesting pads constructed of these materials will readily dry and can be placed in use in the nest rather soon after cleansing.

The nesting pad may be treated with a suitable insecticide either by spraying a solution of the material on and into the fibrous material or by dipping the formed pad into an insecticide solution. The pad can be treated with the insecticide before being shipped and sold to the ultimate customer or treated after each cleaning operation.

The self cleaning of my pad is performed as follows: small particles of foreign matter such as small pieces of litter, feed and grit readily fall through the loosely matted pad with very little interference from the individual strands of fiber. The larger particles or pieces after falling onto the surface of the pad are worked therethrough from one space therein to another as the hen presses a portion of the pad downwardly and then releases it as she walks around on the pad. Most of the foreign matter on reaching the bottom of the pad passes through the cloth bottom of the pad and to the bottom of the nest or, if the hardware nest bottom is used, falls therethrough and drops to the floor of the poultry house. Occasionally pieces of foreign matter originally too large to pass through the pad and hardware cloth are broken by the yielding of the resilient nesting material under the weight of the hen and are thus diminished in size sufficiently to pass through the material and drop from the nest.

Since the quality of the egg as marketed depends to an extent on the rate and time of cooling after being laid, it is important to facilitate rapid cooling promptly after the egg is laid. The present nesting material accelerates cooling in that the material is extremely porous and therefore has very little insulating effect to retain the heat in the egg. Further, if the nesting material is used on hardware cloth or other type of open bottom, the pad is thoroughly ventilated and the egg is cooled by the circulation of air in and through the mass of fibrous material.

Figure 3:
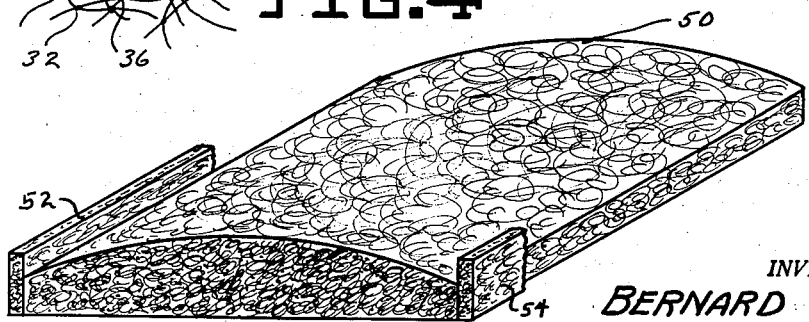
Figure 3 is an enlarged isometric view of a modified form of my nesting pad.

Figure 3 illustrates a modified form of my nesting pad. In this embodiment the pad is provided with an arched upper surface 50. When the hen enters the nest and steps on the pad it is depressed to the extent that the arch is mostly eliminated. After the hen has laid her egg and left the nest the pad promptly returns to its original arched shape, causing the egg to roll gently to one side or the other. When the next hen goes on the nest, the eggs previously laid are not in her way where they would likely be trampled on and broken. To prevent the eggs from being broken when they roll to the side of the nest, soft resilient strips 52 and 54 of rubber or the like are preferably placed along each side.

The nesting material described herein is suitable for either individual nests or for community nests. Various changes in addition to those mentioned herein may be made without departing from the scope of the present invention.

I claim:

1. A porous nesting pad for poultry, comprising a mass of resilient fibrous material having a top surface for supporting a bird and a bottom surface for resting on a porous support, a layer of coarse meshed material secured to said bottom, the fibers of said mass contacting each other at spaced intervals and forming interstices through which foreign matter carried onto the nest may fall, and a bonding material holding said fibers together at their various points of contact, the interstices of the fibrous mass and mesh material being of adequate size to permit foreign material to pass therethrough.

2. The nesting pad structure defined in claim 1 wherein the bonding material is rubber latex.

3. The nesting pad structure defined in claim 1 wherein the fibrous material consists of loosely matted hog's hair.

4. The nesting pad structure defined in claim 1 wherein the fibrous material is vegetable fiber.

5. The nesting pad structure defined in claim 1 wherein bonding material is phenolic resin.

References Cited in the file of this patent

UNITED STATES PATENTS

| | | |
|---|---|---|
| 1,141,346 | Koyen et al. | June 1, 1915 |
| 2,081,334 | Kickenbush | May 25, 1937 |
| 2,515,063 | Stanchfield | July 11, 1950 |
| 2,580,202 | Talalay et al. | Dec. 25, 1951 |
| 2,708,419 | Brown | May 17, 1955 |

FOREIGN PATENTS

| | | |
|---|---|---|
| 526,778 | Great Britain | Sept. 25, 1940 |
| 624,073 | Great Britain | May 26, 1949 |